(12) United States Patent  (10) Patent No.: US 7,249,895 B2
Diaz  (45) Date of Patent: Jul. 31, 2007

(54) OPTICAL TRANSCEIVER WITH CAPACITIVE COUPLED SIGNAL GROUND WITH CHASSIS GROUND

(75) Inventor: Nelson Diaz, Westminster, CO (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/022,301

(22) Filed: Dec. 22, 2004
(Under 37 CFR 1.47)

(65) Prior Publication Data
US 2006/0133744 A1   Jun. 22, 2006

(51) Int. Cl.
*G02B 6/36* (2006.01)
*H05K 1/00* (2006.01)
(52) U.S. Cl. .................... 385/92; 385/94; 439/76.1
(58) Field of Classification Search ............. 385/92–94
See application file for complete search history.

(56) References Cited

U.S. PATENT DOCUMENTS

| | | | |
|---|---|---|---|
| 6,264,481 B1 | 7/2001 | Kozel et al. | |
| 6,335,869 B1 | 1/2002 | Branch et al. | |
| 6,371,663 B1 | 4/2002 | Kneier et al. | |
| 6,682,231 B2 | 1/2004 | Meyer et al. | |
| 6,752,663 B2 | 6/2004 | Bright et al. | |
| 7,013,088 B1* | 3/2006 | Jiang et al. | 398/139 |
| 2002/0119684 A1* | 8/2002 | Gilliland et al. | 439/76.1 |
| 2004/0086240 A1* | 5/2004 | Togami et al. | 385/92 |
| 2004/0198079 A1* | 10/2004 | Aronson et al. | 439/76.1 |
| 2006/0045436 A1* | 3/2006 | Wang et al. | 385/92 |

* cited by examiner

*Primary Examiner*—Michelle Connelly-Cushwa
*Assistant Examiner*—Rhonda S. Peace
(74) *Attorney, Agent, or Firm*—Workman Nydegger

(57) ABSTRACT

An optical transceiver includes a chassis, a printed circuit board, a conducting strip, a cover and a gasket. The chassis has a first reference. The printed circuit board has a second reference. The conducting strip is adjacent the printed circuit board and the cover is coupled over the printed circuit board. The gasket is positioned between the conducting strip and the cover thereby capacitive coupling the first reference to the second reference.

17 Claims, 3 Drawing Sheets

OPTICAL TRANSCEIVER WITH CAPACITIVE COUPLED SIGNAL GROUND WITH CHASSIS GROUND

BACKGROUND

The present invention relates to an optical transceiver. More particularly, the optical transceiver of the present invention is provided a signal ground and a chassis ground that are capacitive coupled utilizing an insulated gasket.

A transceiver module is typically configured with an optical subassembly coupled to a printed circuit board with a processing circuit. The optical subassembly and processing circuit on the printed circuit board are used to transform optical signals coming from optical fibers to an electrical signal, and to transform an electrical signal to an optical signal. A photodiode, pin diode or similar optical receiver contained by the optical subassembly transforms the optical signal to the electrical signal and then sends the electrical signal to the processing circuit. A laser diode, pin diode or similar optical emitter contained within the optical subassembly transforms the electrical signal coming from the processing circuit to the optical signal.

The process of converting optical signals to electrical signals and electrical signals to optical signals in a relatively small package can produce significant electromagnetic radiation and create electromagnetic interference for other electronic devices and components. Although one way to decrease the electromagnetic interference is to directly couple a ground reference from the processing circuit to a ground for the entire transceiver module, it is often not desired in some applications, or is not practicable in other applications, to have such a direct connection of grounds. For these and other reasons, there is a need for the present invention.

SUMMARY

One aspect of the present invention provides an optical transceiver. The optical transceiver includes a chassis, a printed circuit board, a conducting strip, a cover and a gasket. The chassis has a first reference. The printed circuit board has a second reference. The conducting strip is adjacent the printed circuit board and the cover is coupled over the printed circuit board. The gasket is positioned between the conducting strip and the cover thereby capacitive coupling the first reference to the second reference.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
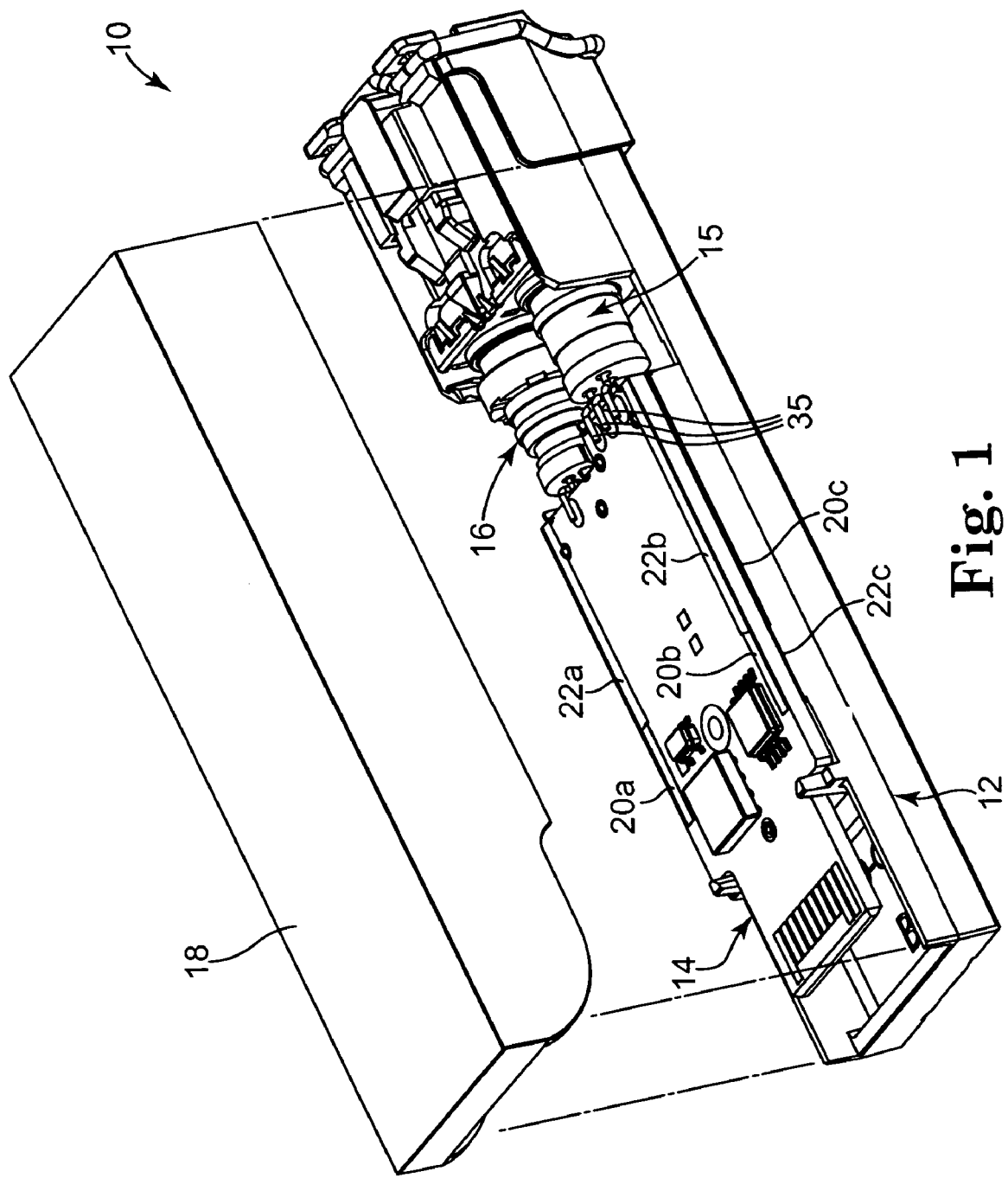
FIG. 1 is a perspective view of a transceiver module including a printed circuit board configured in accordance with one embodiment of the present invention.

FIG. 1 illustrates transceiver module 10 in accordance with one embodiment of the present invention. Transceiver module 10 includes chassis 12, printed circuit board 14, first optical subassembly 15, and second optical subassembly 16. A cover 18 is illustrated exploded off from the remaining module. When assembled, cover 18 fits over chassis 12 and encloses printed circuit board 14 and optical subassemblies 15 and 16.

In operation, the various components of transceiver module 10 are assembled and then connected to optical connectors, such a fiber optic cable, on one side and to a host system, such as a router, computer or other electrical device, on another. Typically, chassis 12 is mounted directly to the host system and has a chassis ground to that host. Transceiver module 10 then transforms electrical signals to optical signals and/or transforms optical signals into electrical signals. Most often, two optical subassemblies 15 and 16 are placed within transceiver module 10, one a transmit subassembly and one a receive subassembly. It is also possible to have a single optical subassembly in accordance with the present invention as well.

Printed circuit board 14 is mounted to chassis 12 and optical subassemblies 15 and 16 are mounted between circuit board 14 and a forward or nose portion of chassis 12. Optical subassemblies 15 and 16 are mounted such that one end of each can be coupled to the circuit board 14 and another end of each couples into the nose portion of chassis 12. Optical subassemblies 15 and 16 may be secured by a seat or nest on chassis 12 such that they are mechanically supported thereon.

Circuit board 14 carries various components thereon. Typically, these components include semiconductor chips and related electrical circuitry that facilitate the processing of electrical and optical signal conversion. Optical subassemblies 15 and 16 illustrated in FIG. 1 include pins 35 projecting from the subassemblies that are connected directly to circuit board 14. Alternatively, flex leads (not shown in FIG. 1) that are made of a conducting material can be used and configured to electrically couple circuit board 14 with optical subassemblies 15 and 16.

In one embodiment, one of optical subassemblies 15 and 16 functions as an optical transmitter and the other functions as an optical receiver, and each include subassembly pins 35. Pins 35 are electrically coupled to circuit board 14 when transceiver module 10 is fully assembled. Optical subassemblies 15 and 16 may include a photodiode, pin diode or similar optical receiver, for transforming optical signals to electrical signals. Optical subassemblies 15 and 16 may also, or alternatively, include a laser, pin diode, or a similar optical emitter for transforming electrical signals to optical signals. In one alternative embodiment, a single optical subassembly is used, the single optical subassembly being a bidirectional optical subassembly. In this case, the components for both transmitting and receiving are contained within the single optical subassembly. Whether an optical subassembly is functioning as an optical transmitter or as an optical receiver, it will contain some sort of optoelectronic device, such as a photodiode or a laser.

Further illustrated in FIG. 1, are conductive strips 20 and insulating gaskets 22. Specifically, first conductive strip 20a is illustrated adjacent an edge (the "upper-far edge" as illustrated in FIG. 1) of printed circuit board 14, second conductive strip 20b is illustrated adjacent an edge (the "upper-near" edge as illustrated in FIG. 1) of printed circuit board 14, and third conductive strip 20c is illustrated adjacent an edge (the "lower-near" edge as illustrated in FIG. 1) of printed circuit board 14. A fourth conductive strip 20d is also provided in one embodiment adjacent printed circuit board 14 below first conductive strip 20a (the "lower-far" edge as illustrated in FIG. 1), but is not visible in FIG. 1. Similarly, first, second, third, and fourth insulating gaskets 22a, 22b, 22c, and 22d are also provided adjacent first, second, third, and fourth conductive strips 20a, 20b, 20c, and 20d, respectively. In FIG. 1, first and second insulating gaskets 22a and 22b have been partially removed to better illustrate first and second conducting strips 20a and 20b, and fourth insulating gaskets 22d is not visible.

Figure 2:
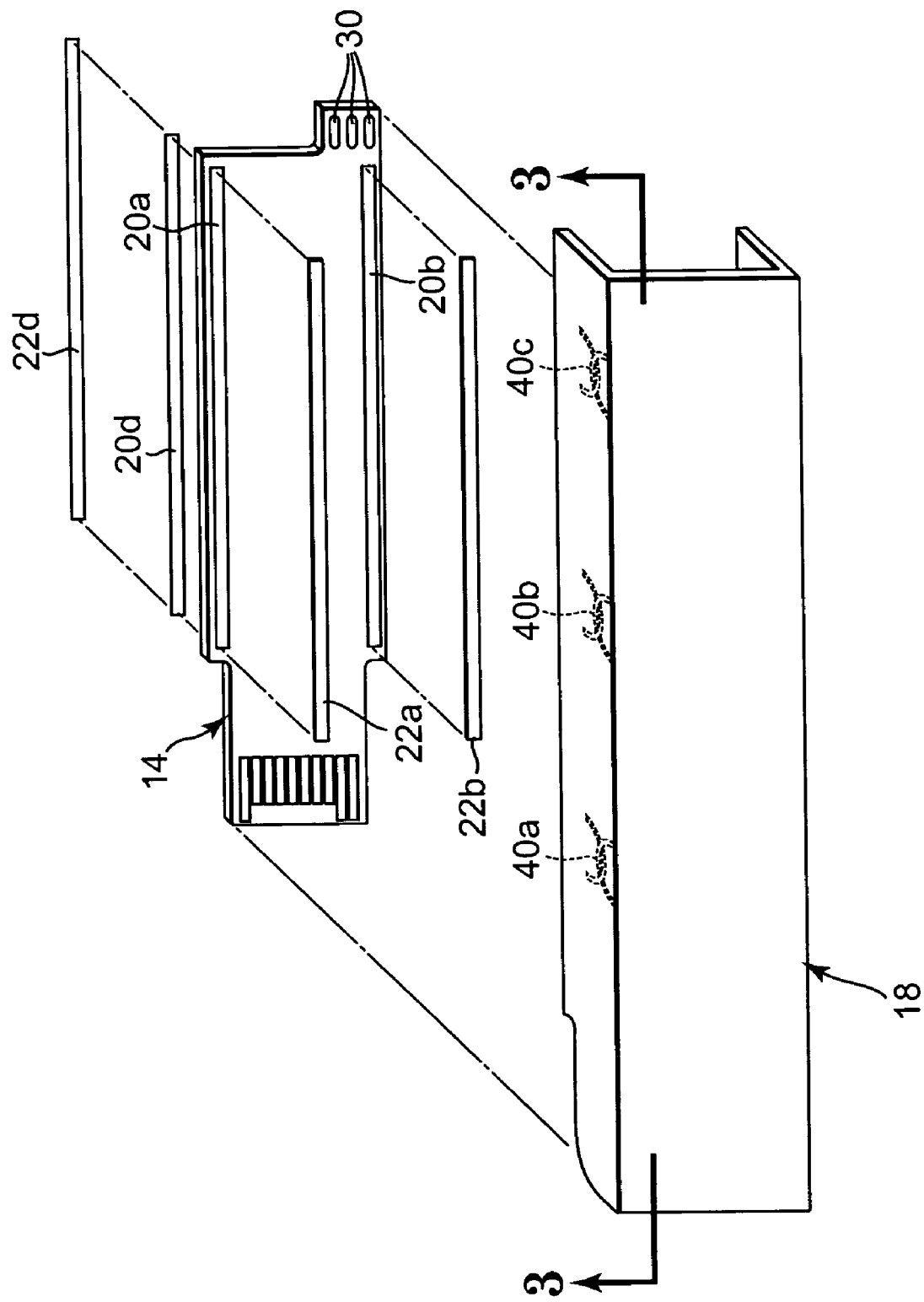
FIG. 2 illustrates an exploded plan view of a portion of a transceiver module including a printed circuit board configured in accordance with one embodiment of the present invention.

FIG. 2 illustrates an exploded plan view of a portion of a transceiver module 10 in accordance with one embodiment of the present invention, including a printed circuit board 14, conductive strips 20a–20d, gaskets 22a–22d and cover 18 (third strip 20c and third gasket 22c are not visible in FIG. 2). Printed circuit board 14 includes a processing circuit for processing signals used in the conversion of electrical signal to optical signals and in the conversion of optical signals to electrical signal. Pads 30 on printed circuit board 14 may be coupled to leads 35 on optical subassembly 15 or 16 to help facilitate this conversion. In addition, these conversion signals are electrically coupled to conductive strips 20a–20d via traces or similar conductors in printed circuit board 14.

Typically, transceiver module 10 is plugged into a slot, such as a blade server, that is metallic or otherwise conductive such that the module chassis 12 and cover 18 are well grounded. This may be referred to as chassis ground reference. The conversion electrical signals that are transmitted on printed circuit board 14, including on conductive strips 20a–20d, have what may be referred to as a signal ground reference. In many cases the chassis ground reference and signal ground reference are not directly coupled together.

The conversion electrical signals that are transmitted on printed circuit board 14, however, can produce significant electromagnetic radiation and create electromagnetic interference for other electronic devices and components. One way to decrease the electromagnetic interference from these signals is to directly couple the ground reference from the processing circuit printed circuit board 14 to the chassis ground reference. Chassis ground reference, however, can be very noisy relative to the fairly well filtered ground reference from the processing circuit. In this way, it is not always desirable to directly couple the ground reference from the processing circuit printed circuit board 14 to the chassis ground reference.

When fully assembled, transceiver module 10 provides a signal reference and a chassis reference, which are not directly coupled, but are capacitive coupled. In this way, electromagnetic interference from these signals is decreased via the capacitive coupling of the ground reference from the processing circuit printed circuit board 14 to the chassis ground reference.

Rather than directly couple these signals to cover 18, transceiver module 10 capacitive couples these signals via the combination of conductive strips 20a–20d, which are metallic or conducting, gaskets 221–22d, which are dielectrics, and cover 18, which is metallic or conducting. Furthermore, cover 18 is mounted over chassis 12 (FIG. 1), which is also metallic or conducting. The combination of conductive strips 20a–d and conductive cover 18 sandwiching dielectric gaskets 22a–d creates an effective capacitor thereby capacitive coupling the ground reference of conversion signals to the ground reference of cover 18 and chassis 12.

In FIG. 2, a portion of cover 18 is partially ghosted to illustrate first, second and third spring clips 40a, 40b, and 40c, which are attached to an inside wall of cover 18. When transceiver module 10 is fully assembled, cover 18 is fitted onto chassis 12 such that spring clips 40a–40c are biased against first gasket 22a. Typically, spring clips 40a–40c are conductive, and where gaskets 22a–22d are not present, spring clips 40a–40c conductively couple cover 12 to conductive strips 20a–20d. With the presence of gaskets 22a–22d, however, spring clips 40a–40c help facilitate the capacitive coupling of ground reference of conversion signals in conductive strips 20a–20d to the ground reference of cover 18.

Figure 3:
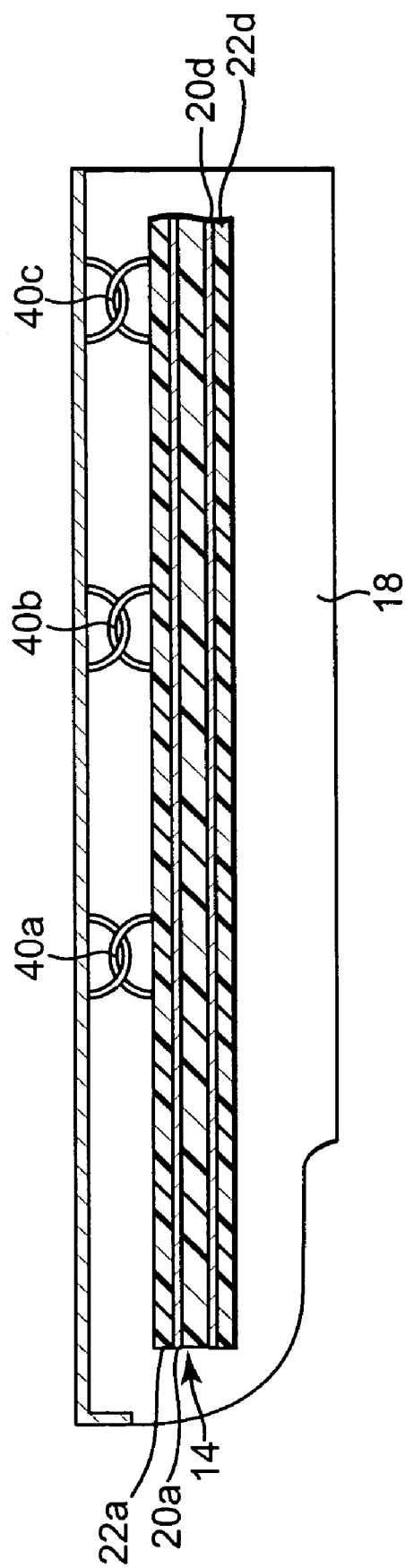
FIG. 3 illustrates a cross-section of a portion of a transceiver module including a printed circuit board configured in accordance with one embodiment of the present invention.

FIG. 3 is a cross-section taken along line 3—3 from FIG. 2 illustrating a portion of transceiver module 10 in accordance with one embodiment of the present invention. Illustrated are printed circuit board 14, conductive strips 20a and 20d, gaskets 22a and 22d and cover 18. The right side of circuit board 14, conductive strips 20, and gaskets 22 are not fully illustrated and have been broken in the figure. In this embodiment, a stack is essentially formed in the cross-section. Spring clips 40a–40c are illustrated biased against gasket 22a and cover 18.

Printed circuit board 14 is illustrated as a single layer, but may in fact comprise multiple layers. Immediately above and below printed circuit board 14 are layers of conductive strips 20a and 20d, respectively. Above the upper conductive strip 20a and below the lower conductive strip 20d are gaskets 22a and 22d, respectively. Above the upper gasket 22a and below the lower gasket 22d is the cover 18. In this way, transceiver module 10 provides a signal ground reference and a chassis ground reference that are capacitive coupled both above and below printed circuit board 14.

As above, printed circuit board 14 includes a processing circuit for processing signals used in the conversion of electrical signal to optical signals and in the conversion of optical signals to electrical signal (in cooperation with an optical assemble not illustrated in FIG. 3) thereby producing electromagnetic interference. These conversion signals are electrically coupled to conductive strips 20 on printed circuit board 14, which has a signal ground reference. Rather than directly couple these signals to cover 18 to reduce the electromagnetic interference, however, transceiver module 10 in accordance with one embodiment of the present invention capacitive couples signal ground reference to chassis ground reference via the combination of conductive strips 20a–20d, gaskets 22a–22d, and cover 18, which is metallic or conducting itself. The combination of conductive strips 20a–22d and metal cover 18 sandwiching gaskets 22a–22d, which is a dielectric material, creates an effective capacitor thereby capacitive coupling the ground reference of the conversion signals to the ground reference of cover 18 and chassis 12.

In one embodiment, gaskets 22a–22d are configured to be excellent conductors of heat and a poor conductors of electricity. Consequently, in the combined layers of conductive strips 20a–20d, gaskets 22a–22d, and metal cover 18, the poor-conducting gaskets 22a–22d act as a dielectric, thereby forming a planar capacitive coupler. Yet, since gaskets 22a–22d are configured to be excellent conductors of heat, the significant heat generated in the signal conversion process is dissipated well via gaskets 22a–22d.

In some embodiments, conductive strips 20a–20d may be coupled to a source voltage $V_{cc}$, or in others to a ground signal, such that there is alternatively good planar capacitive coupler between signal $V_{cc}$ or signal ground and the chassis ground reference for transceiver module 10. Thus, in some cases the signal reference that is capacitive coupled to chassis reference is signal $V_{cc}$, while in other cases the signal reference that is capacitive coupled to chassis reference is signal ground.

In an alternative embodiment of transceiver module 10 in accordance with the present invention, fewer layers of conductive strips 20 and insulating gaskets 22 than illustrated in the figures may be used. For example, in one case only first conductive strip 20a and first gasket 22a are placed over printed circuit board 14. In an alternative example, only third conductive strip 20c and third gasket 22c are placed under printed circuit board 14. Those of ordinary skill in the art will see that other layer combinations are possible in accordance with the present invention.

The capacitance of the combination of conductive strips 20a–20d and metal cover 18 positioned relative to gaskets 22a–22d may be calculated using the known relationship of capacitance in parallel plate capacitors: $C=(k*\epsilon_0*A)/d$, where k=relative permittivity of the dielectric material (gasket 22) between the conductive strips 20, $\epsilon_0$=permittivity of space, A=the area of conductive strips 20, and d=the distance between strips 20. In one embodiment, where Mylar® is used as dielectric material, the capacitance is given as $C=2.25\times10^{-13}*\epsilon_0*A)/d$. Where Mylar® is used, it also provides good heat conductance as well. Other high-dielectric strength materials may also be used in accordance with the present invention.

Using the combination of conductive strips 20a–20d and conductive cover 18 positioned relative to gaskets 22a–22d to capacitive couple signal ground reference to chassis ground reference has advantages in many embodiments in that its planar characteristic may avoid resonating at relatively low frequencies. For this planar capacitive coupling, impedance goes down, and then it does not begin to start moving up until a much higher frequency is attained. In this way, a transceiver using the planar capacitive coupling may be quite effective in reducing electromagnetic interference.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical transceiver comprising:
   chassis having a first reference;
   a printed circuit board having a second reference;
   a first conducting strip adjacent the printed circuit board; and
   a first gasket positioned between the conducting strip and the chassis so that the conducting strip and chassis are each in contact with the first gasket thereby capacitive coupling the first reference to the second reference.

2. The optical transceiver of claim 1, further including a cover electrically coupled to the chassis and coupled over the printed circuit board.

3. The optical transceiver of claim 1, wherein the printed circuit board is coupled within the chassis and configured to carry electrical conversion signals for converting electrical signals to optical signals and for converting optical signals to electrical signals.

4. The optical transceiver of claim 1, wherein the first reference is a ground reference for the transceiver chassis.

5. The optical transceiver of claim 3, wherein the second reference is a ground reference for the electrical conversion signals.

6. The optical transceiver of claim 1, wherein the first gasket is made of Mylar®.

7. The optical transceiver of claim 1, further comprising first and second optical subassemblies in electrical communication with the printed circuit board, the first optical subassembly including an optical receiver, and the second optical subassembly including an optical transmitter.

8. The optical transceiver of claim 1, further comprising a spring clip in contact with the conducting strip and with the chassis.

9. An optical transceiver comprising:
   a cover having a first reference;
   a printed circuit board having a second reference and coupled with the cover;
   a first conducting strip adjacent the printed circuit board; and
   a first gasket positioned between the conducting strip and the cover so that the conducting strip and chassis are each in contact with the first gasket thereby capacitive coupling the first reference to the second reference.

10. The optical transceiver of claim 9, further including a chassis electrically coupled to the cover, wherein the printed circuit board is mounted on the chassis.

11. The optical transceiver of claim 9, wherein the printed circuit board is coupled within the cover and configured to carry electrical conversion signals for converting electrical signals to optical signals and for converting optical signals to electrical signals.

12. The optical transceiver of claim 11, wherein the first conducting strip adjacent the printed circuit board is electrically coupled to the electrical conversion signals.

13. The optical transceiver of claim 11, further including a second conducting strip electrically coupled to the electrical conversion signals adjacent the printed circuit board and generally parallel to the first conducting strip.

14. The optical transceiver of claim 13 further including a second gasket positioned between the second conducting strip and the cover thereby further capacitive coupling the first reference to the second reference.

15. The optical transceiver of claim 14 further including third and fourth conducting strips coupled to the electrical conversion signals and adjacent the printed circuit board on an opposite surface of the printed circuit board from the first and second conducting strips.

16. The optical transceiver of claim 15 further including third and fourth gaskets positioned between the third and fourth conducting strips and the cover thereby further capacitive coupling the first reference to the second reference.

17. The optical transceiver of claim 9 further including an optical subassembly having a can and a barrel, the optical subassembly coupled within the cover and electrically coupled to the printed circuit board.

* * * * *

UNITED STATES PATENT AND TRADEMARK OFFICE
CERTIFICATE OF CORRECTION

PATENT NO. : 7,249,895 B2  Page 1 of 1
APPLICATION NO. : 11/022301
DATED : July 31, 2007
INVENTOR(S) : Nelson Diaz It is certified that error appears in the above-identified patent and that said Letters Patent is hereby corrected as shown below:

Column 2
Line 31, change "exploded off" to --detached--

Column 4
Line 16, change "221-22$d$" to --22$a$-22$d$--
Line 20, change "20$a$-$d$" to --20$a$-20$d$--
Line 21, change "22$a$-$d$" to --22$a$-20$d$--

Signed and Sealed this

Twenty-third Day of September, 2008

JON W. DUDAS
*Director of the United States Patent and Trademark Office*